Dec. 5, 1950     W. R. CUSTER     2,532,481
MULTIPLE CHANNEL WING AIRPLANE
Filed Oct. 9, 1946
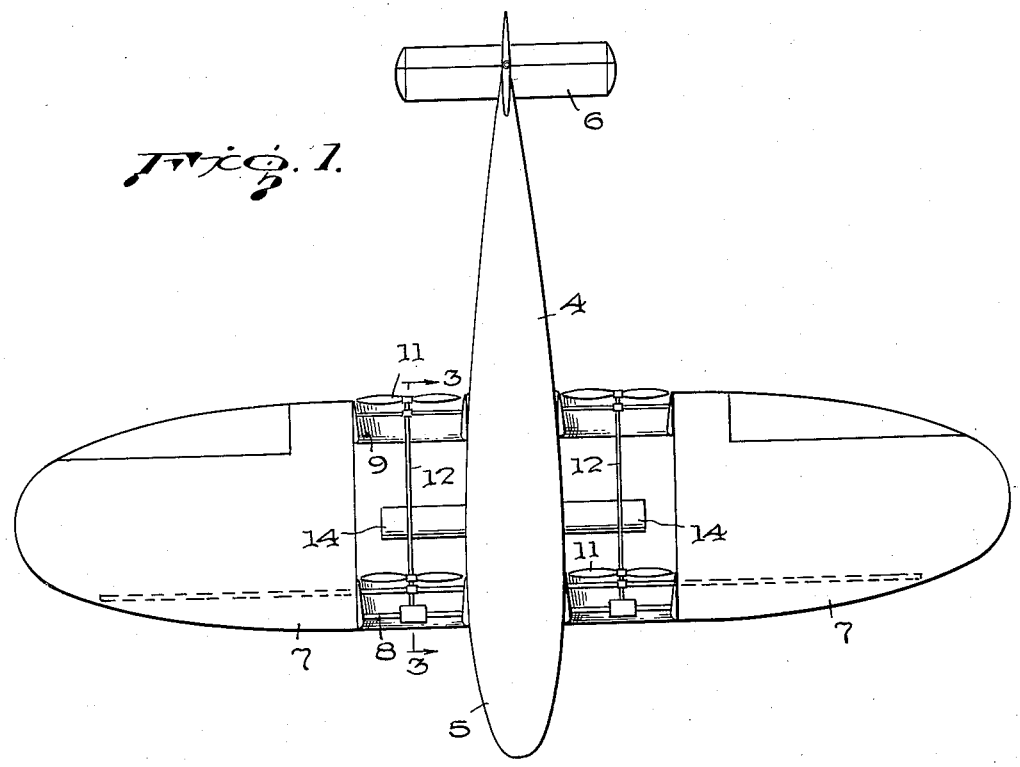
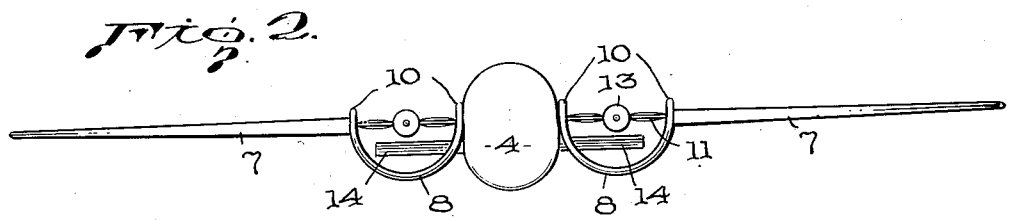
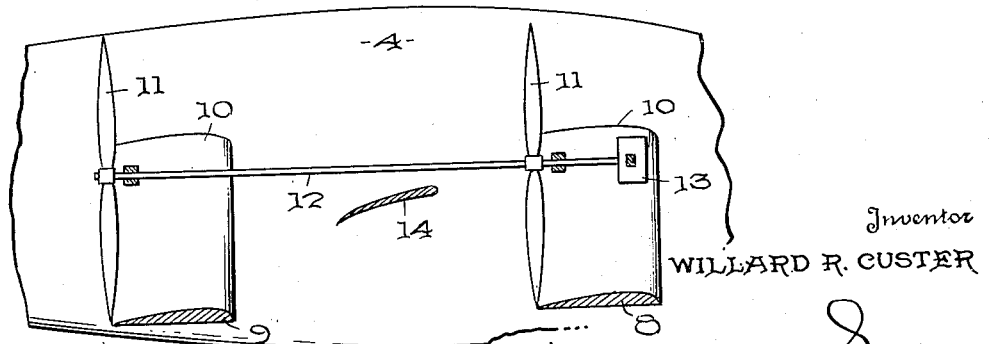
Inventor
WILLARD R. CUSTER
By Bernard F. Harvey
Attorney Patented Dec. 5, 1950

2,532,481

UNITED STATES PATENT OFFICE 2,532,481

MULTIPLE CHANNEL WING AIRPLANE

Willard R. Custer, Hagerstown, Md.

Application October 9, 1946, Serial No. 702,211

5 Claims. (Cl. 244—12)

This invention is an improvement on the Custer channel wing for airplanes having for general objects increase in static lift, increase in speed range ratio with corresponding increase of safety factors in landing and greater stability in flight.

Experiments have proven, beyond per-adventure, that a channel wing with the channel opening upwardly and extending from the fore to the aft edge of the wing with the propeller discs practically contiguous to the aft or trailing edge of the wing, produces phenomenal results especially in static lift. Additional experiments show that the results are greatly increased by providing multiple channels arranged in tandem, each of which is equipped with a propeller operating in very close proximity to its aft edge.

It is also within the contemplation of this invention to mount one or more ailerons between the channels in the slipstream of the lower half of the propeller disc and to extend the upper margins of the wing to a point appreciably above the propeller axes to provide fins.

Other objects of the invention will be apparent from the following description of the present preferred form of the invention taken in connection with the accompanying drawings wherein;

Figure 1 is a top plan view of a multiple channel wing airplane constructed in accordance with the present invention;

Figure 2 is a front elevational view thereof; and

Figure 3 is a transverse sectional view through the wing taken along the lines 3—3 of Figure 1 looking in the direction of the arrows.

The present invention includes a fuselage 4 which is of substantially standard construction being provided in its nose end with a cockpit 5 and at its aft end with an empennage or tail assembly 6. Extending outwardly from each side of the fuselage, near the fore end of the latter, is a wing 7 the root of each wing being formed to provide, or is equipped with, fore and aft channels 8 and 9 respectively arranged in tandem. The channels are of generally semi-cylindrical configuration and open upwardly. The upper margins of the channels are extended to provide fins 10. Each of the channels 8 and 9 is equipped with an aft propeller 11, the propellers of one pair of tandem channels being operatively connected to a power shaft 12, one end of which is engaged to a motor or other power unit 13. Particularly upon reference to Figure 3, it will be noted that the propellers 11 are located in very close proximity to the trailing edges of the channels 8 and 9 so that the propeller discs will for all practical purposes be contiguous to the aft edges of the channels.

Extended laterally from each side of the fuselage 4 between the channels 8 and 9 is an aileron 14. The number of ailerons may be increased and are operated in a conventional manner from the cockpit.

The fins 10 extend appreciably above the axes of the power shafts 12 and also above the upper surfaces of the wings 7 providing channels considerably in excess of 180°. Therefore, the rear edge of each channel generally coincides with the lower one half and a portion of the upper one half of the periphery of its propeller disc.

By providing multiple channels on each side of the fuselage, the lift factor is correspondingly increased and the lift accelerated in conjunction with the advantages obtained in landing and in flight. I am aware of course that various changes may be made in this device within the scope of the claims hereto appended.

What I claim is:

1. An aircraft having a lifting surface, said lifting surface being provided with multiple upwardly opening channels, the channels arranged at intervals in axial alignment from the front to the rear edge of the surface, propellers mounted on said surface, one being operable aft of each channel, each of said propellers being disposed to produce a rearward flow of air over the inside channel wall, the plane of rotation of each propeller disc being substantially in the transverse plane defined by the rear edge of its respective channel, the rear edge of each channel generally coinciding with the lower half of the periphery of the respective propeller disc.

2. An airplane including a fuselage, a wing extending from each side of the fuselage, portions of each wing being channeled fore and aft and opening upwardly to provide multiple channels arranged in tandem on each side of the fuselage, and a propeller for each channel, mounted for operation in close proximity to the aft edge of its respective channel, each said propeller being disposed to produce a rearward flow of air over the inside channel wall.

3. An aircraft including a wing provided with multiple spaced apart channels arranged in tandem and opening upwardly, a propeller for each channel mounted to operate in close proximity to the aft edge of its respective channel, each said propeller being disposed with respect to its respective channel in such manner as to be effective to produce a rearward flow of air over the inside channel wall, and an aileron operatively mounted between said channels.

4. An aircraft according to claim 3 in which the upper margins of the channels are extended above the top surface of the wing to provide fins.

5. An aircraft including a wing provided with multiple spaced apart channels arranged in tandem and opening upwardly, and a propeller for each channel mounted to operate in close proximity to the aft edge of its respective channel, each said propeller being disposed, with respect to its respective channel, in such manner as to be effective to produce a rearward flow of air over the inside channel wall.

WILLARD R. CUSTER.

REFERENCES CITED

The following references are of record in the file of this patent:

UNITED STATES PATENTS

| Number | Name | Date |
|---|---|---|
| 1,794,844 | Gienger | Mar. 3, 1931 |
| 1,802,860 | Zwinkel | Apr. 28, 1931 |
| 1,857,473 | Oberstag | May 10, 1932 |